United States Patent
Wang et al.

(10) Patent No.: US 10,061,762 B2
(45) Date of Patent: Aug. 28, 2018

(54) METHOD AND DEVICE FOR IDENTIFYING INFORMATION, AND COMPUTER-READABLE STORAGE MEDIUM

(71) Applicant: Xiaomi Inc., Beijing (CN)

(72) Inventors: Pingze Wang, Beijing (CN); Tao Zhang, Beijing (CN); Zhijun Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/341,144

(22) Filed: Nov. 2, 2016

(65) Prior Publication Data

US 2017/0147553 A1     May 25, 2017

(30) Foreign Application Priority Data

Nov. 24, 2015    (CN) .......................... 2015 1 0827530

(51) Int. Cl.
- G06F 17/27     (2006.01)
- G06F 17/24     (2006.01)
- H04W 4/14     (2009.01)
- G06F 17/30     (2006.01)
- G06Q 10/06     (2012.01)

(52) U.S. Cl.
CPC ........ *G06F 17/248* (2013.01); *G06F 17/2705* (2013.01); *G06F 17/2765* (2013.01); *G06F 17/30705* (2013.01); *G06Q 10/06* (2013.01); *H04W 4/14* (2013.01)

(58) Field of Classification Search
CPC . G06F 17/2765; G06F 17/248; G06F 17/2705
USPC ............................................................. 704/9
See application file for complete search history.

(56) References Cited

U.S. PATENT DOCUMENTS

| | | | |
|---|---|---|---|
| 5,991,748 A | * | 11/1999 | Taskett ................. G06Q 20/10 705/39 |
| 6,192,360 B1 | | 2/2001 | Dumais et al. |
| 7,386,560 B2 | | 6/2008 | Tan |
| 7,457,808 B2 | * | 11/2008 | Gaussier ................ G06K 9/623 |
| 7,756,535 B1 | | 7/2010 | Diao et al. |
| 8,000,455 B1 | * | 8/2011 | Van Haaften ...... G06Q 30/0267 341/50 |
| 8,023,974 B1 | * | 9/2011 | Diao ..................... G06K 9/6269 455/466 |

(Continued)

FOREIGN PATENT DOCUMENTS

| CN | 102024045 A | 4/2011 |
|---|---|---|
| CN | 102404462 A | 4/2012 |

(Continued)

OTHER PUBLICATIONS

International Search Report corresponding to International Application No. PCT/CN2015/099305 dated Aug. 8, 2016, 11 pages.

(Continued)

*Primary Examiner* — Jakieda Jackson
(74) *Attorney, Agent, or Firm* — Brinks, Gilson & Lione

(57) ABSTRACT

A method, device, and a non-transitory computer-readable storage medium are provided for identifying information in an electronic message. The information from the electronic message may be identified according to a template that has been trained to classify the information included in the electronic message.

9 Claims, 10 Drawing Sheets

(56) References Cited

U.S. PATENT DOCUMENTS

| | | | |
|---|---|---|---|
| 8,073,472 B1* | 12/2011 | Thakur | G06Q 20/10 |
| | | | 455/466 |
| 8,892,446 B2* | 11/2014 | Cheyer | G06F 17/3087 |
| | | | 704/246 |
| 2004/0114738 A1* | 6/2004 | Voorman | G06Q 20/04 |
| | | | 379/114.01 |
| 2005/0113062 A1* | 5/2005 | Pelaez | H04M 15/57 |
| | | | 455/405 |
| 2008/0189110 A1 | 8/2008 | Freeman et al. | |
| 2009/0125529 A1 | 5/2009 | Vydiswaran et al. | |
| 2010/0094626 A1 | 4/2010 | Li et al. | |
| 2010/0145678 A1* | 6/2010 | Csomai | G06F 17/2755 |
| | | | 704/9 |
| 2011/0055699 A1 | 3/2011 | Li et al. | |
| 2011/0184817 A1 | 7/2011 | Yankov et al. | |
| 2013/0109350 A1* | 5/2013 | Skelton | H04W 4/14 |
| | | | 455/411 |
| 2014/0215072 A1* | 7/2014 | Li | H04W 48/02 |
| | | | 709/225 |
| 2015/0039292 A1* | 2/2015 | Suleman | G06F 17/289 |
| | | | 704/9 |
| 2015/0066479 A1 | 3/2015 | Pasupalak et al. | |
| 2015/0163186 A1 | 6/2015 | Tian | |
| 2015/0254230 A1* | 9/2015 | Papadopoullos | G06F 17/275 |
| | | | 704/8 |
| 2017/0228367 A1* | 8/2017 | Pasupalak | G06F 17/279 |

FOREIGN PATENT DOCUMENTS

| | | |
|---|---|---|
| CN | 103914530 A | 7/2014 |
| CN | 104081385 A | 10/2014 |
| CN | 104217717 A | 12/2014 |
| CN | 104346326 A | 2/2015 |
| CN | 105447750 A | 3/2016 |
| JP | 2002-092006 A | 3/2002 |
| JP | 2002-519766 A | 7/2002 |
| JP | 2006-301972 A | 11/2006 |
| JP | 2007/207161 A | 8/2007 |
| JP | 2010-009307 A | 1/2010 |
| JP | 2010-056682 A | 3/2010 |
| JP | 2010-117797 A | 5/2010 |
| JP | 2010-128774 A | 6/2010 |
| JP | 2010-182165 A | 8/2010 |
| JP | 2013-134625 A | 7/2013 |
| KR | 10-2004-0055292 A | 6/2004 |
| KR | 10-2012-0137424 A | 12/2012 |
| RU | 2 368 946 C2 | 9/2009 |
| WO | WO 2012/148950 A2 | 11/2012 |

OTHER PUBLICATIONS

Extended European Search Report dated Jan. 30, 2017 for European Application No. 16197837.4, 9 pages.
Office Action dated Feb. 20, 2017 for Korean Application No. 10-2016-7005592, 13 pages.
Fan, Xiaoli, English Language Abstract of "Feature Extraction in Document Classifiers: Research and Implementation," Northwestern University, China, Jun. 10, 2011, 71 pages.
Office Action dated Oct. 9, 2017 for Chinese Application No. 201510827530.8, 11 pages.
Notice of Grant of Patent dated Aug. 31, 2017 for Korean Application No. 10-2016-7005592, 3 pages.
Office Action dated Aug. 2, 2017 for Russian Application No. 2016113791/08, 17 pages.
Katsuyuki Fujihata et al., "Extraction of Numerical Expressions by Constraints and Default Rules of Dependency Structure," vol. 2001, No. 86, 2001, pp. 119-125.
Examination Report dated Jan. 24, 2018 for European Application No. 16197837.4, 8 pages.
Office Action dated Mar. 6, 2018 for Japanese Application No. 2017-552212, 5 pages.
Summons to Attend Oral Proceedings dated Jul. 5, 2018 for European Application No. 16197837.4, 10 pages.

* cited by examiner

METHOD AND DEVICE FOR IDENTIFYING INFORMATION, AND COMPUTER-READABLE STORAGE MEDIUM

CROSS-REFERENCE TO RELATED APPLICATIONS

This application claims priority to Chinese Patent Application No. 201510827530.8, filed on Nov. 24, 2015, the entirety of which is hereby incorporated by reference herein.

FIELD

The present disclosure generally relates to a data processing field, and more particularly to a method and device for identifying information and a computer-readable storage medium.

BACKGROUND

SMS electronic messages may be used to provide timely notifications and/or alerts to users. For example, a user may receive SMS notifications containing information about a wireless account, such as airtime balance reminders, remaining data flow notifications from network operators, or other information such as account balance information short electronic messages and credit card payment information from banks.

SUMMARY

A method and device for constructing a template, a method and device for identifying information, and a computer-readable storage medium for implementing the same are provided in the present disclosure to improve accuracy of information identification.

According to a first exemplary embodiment of the present disclosure, a method for constructing a template is provided. The method may include obtaining an original information sample set including at least one piece of original information that belongs to a preset class, in case that the original information includes a preset keyword, labeling the preset keyword based on a preset keyword set to obtain a sample training set, segmenting clauses including the preset keyword in the sample training set to obtain one or more words, extracting a specified characteristic set from the one or more words, wherein the specified characteristic set includes at least one characteristic word, constructing the template based on the preset keyword and the characteristic word in the specified characteristic set, and training the template based on labeling results in the sample training set.

According to a second exemplary example of the present disclosure, a method for identifying information is provided. The method may include obtaining at least one clause in target information to be identified, wherein the clause includes a preset keyword, segmenting the clause to obtain one or more words and extracting a specified characteristic set from the one or more words, wherein the specified characteristic set includes at least one characteristic word, identifying a labeling result of the preset keyword in the clause based on the preset keyword, the characteristic word, and a template that is constructed in advance.

According to a third exemplary embodiment of the present disclosure, a device for constructing a template is provided. The device may include a sample obtaining module configured to obtain an original information sample set including at least one piece of original information that belongs to a preset class, a sample processing module configured to, in case that the original information includes a preset keyword, label the preset keyword based on a preset keyword set to obtain a sample training set, a segmentation implementing module configured to segment clauses including the preset keyword in the sample training set to obtain one or more words, a characteristic extracting module configured to extract a specified characteristic set from the one or more words, wherein the specified characteristic set includes at least one characteristic word, a template constructing module configured to construct the template based on the preset keyword and the characteristic word in the specified characteristic set, a template training module configured to train the template based on labeling results in the sample training set.

According to a fourth exemplary embodiment of the present disclosure, a device for identifying information is provided. The device may include a clause obtaining module configured to obtain at least one clause in target information to be identified, wherein the clause includes a preset keyword, a word extracting module configured to segment the clause to obtain one or more words and extract a specified characteristic set from the one or more words, wherein the specified characteristic set includes at least one characteristic word, an identification implementing module configured to identify a labeling result of the preset keyword in the clause based on the preset keyword, the characteristic word, and a template that is constructed in advance.

According to a fifth exemplary embodiment of the present disclosure, a device for constructing a template is provided. The device may include a processor; and a memory for storing instructions executable by the processor, wherein the processor is configured to execute the instructions to: obtain an original information sample set including at least one piece of original information that belongs to a preset class, in case that the original information includes a preset keyword, label the preset keyword based on a preset keyword set to obtain a sample training set, segment clauses including the preset keyword in the sample training set to obtain one or more words, extract a specified characteristic set from the one or more words, wherein the specified characteristic set includes at least one characteristic word, construct the template based on the preset keyword and the characteristic word in the specified characteristic set, and train the template based on labeling results in the sample training set.

According to a sixth exemplary embodiment of the present disclosure, a device for identifying information is provided. The device may include a processor; and a memory for storing instructions executable by the processor; wherein the processor is configured to execute the instructions to: obtain at least one clause in target information to be identified, wherein the clause includes a preset keyword, segment the clause to obtain one or more words and extract a specified characteristic set from the one or more words, wherein the specified characteristic set includes at least one characteristic word, and identify a labeling result of the preset keyword in the clause based on the preset keyword, the characteristic word, and a template that is constructed in advance.

According to a seventh exemplary embodiment of the present disclosure, a non-transitory computer-readable storage medium having stored therein instructions that, when executed by a processor, causes the processor to perform a method for identifying information is disclosed. The method may comprise obtaining at least one clause in target information to be identified, wherein the clause comprises a preset keyword, segmenting the clause to obtain one or more words and extracting a specified characteristic set from the one or more words, wherein the specified characteristic set comprises at least one characteristic word, and identifying a labeling result of the preset keyword in the clause based on the preset keyword, the characteristic word, and a template that is constructed in advance.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Exemplary embodiments of the present disclosure provides a way to identify an electronic message based on an information class by using a constructed template. For example, the template may be trained to categorize an electronic message into a specific class of digital information. The electronic message may then accordingly be assigned to the specific class of digital information by the trained template. The electronic message described herein may, for example, be a Short Message Service (SMS) message or other type of text message, an email, or other type of electronic message containing text. For exemplary purposes, the electronic message reference in the embodiments described herein may relate to a SMS message type of electronic message. However other types of electronic messages are also applicable.

The template may include a wide variety of digital information included in an electronic message sent by a network operator, service provider, another user's communication device, or other such digital information related to an electronic message. For example, for a telecom fee template, the template may include telecom fee information. For a mobile phone traffic template, the template may include mobile phone traffic information. Each template may be subdivided into one or more information classes. For example, for the telecom fee template, the information classes may include an "airtime balance" class, an "other balance" class, and a "non-balance" class. Each template may also include certain keywords, as described in more detail with respect to the flow diagram 400 shown in FIG. 4 where the keywords are characteristic words such as "airtime", "balance" and "64.8".

Figure 1:
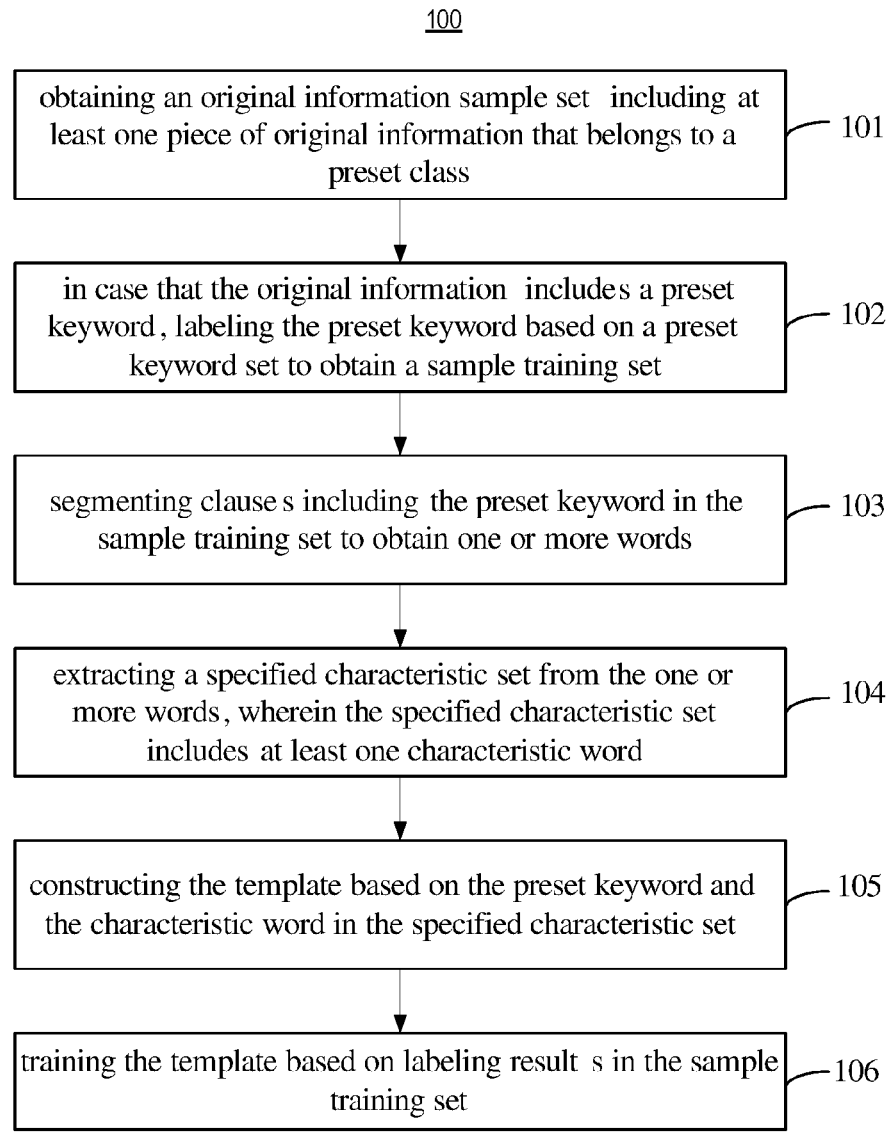
FIG. 1 shows a flow diagram describing a method for constructing a template according to an exemplary embodiment.

FIG. 1 shows a flow diagram 100 of logic describing a method for constructing a template according to an exemplary embodiment, wherein the method includes the following processes. The method may be implemented by an application running on, for example, a communication device. The communication device may include well known computing systems, environments, and/or configurations suitable for implementing features described herein such as, but not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like.

At 101, an original information sample set may be obtained, wherein the original information sample set includes at least one piece of original information that belongs to a preset class. For example, for a SMS message that includes information stating "your airtime balance is less than 10 Yuan", or "your remaining flow is 845 MB this month", or "your grant balance is 344 Yuan, please confirm", the SMS message could be identified as belonging to an "airtime balance" class, an "other balance" class, and a "non balance" class, respectively.

For example, when identifying a SMS message sent by an service provider, the original information may be determined to be the SMS sent by the service provider, or more specifically the original information may be determined to be the information included in the electronic message. The electronic message may be forwarded to a device for constructing a template by a smart phone, or other communication device, when the original information is received by the smart phone. The device receiving the forwarded electronic message may be a server operating to train the templates. Identification of the electronic message may be accomplished later on a communication device. The service provider may, for example, be a telecommunications service provider or mobile network operator that provides wireless communications services to the user receiving the SMS message.

The original information may be categorized into one or more preset classes based on the template to be constructed. For example, when the template to be constructed is determined to be a template for identifying telecom fee information, the original information may be part of an original information sample set, where the original information sample set includes at least one SMS message including telecom fee information. Based on the template to be constructed being determined to be a template for identifying telecom fee information, the original information may be categorized into an information class, where the original information includes telecom fee information service provider At 102, when the original information is determined to include a preset keyword, the preset keyword may be labeled based on a preset keyword set to obtain a sample training set.

For example, the preset keyword, particularly a class of the preset keyword may be labeled when the class of the original information is identified. For example, when the smart phone receives a SMS message that includes information representing the statement "your airtime balance is 12 Yuan" for notifying an airtime balance sent by the service provider, the preset keyword may be identified from the SMS message as being "12" and the labeling of the preset keyword "12" may be implemented to label the class corresponding to the preset keyword "12". For example, the preset keyword "12" may be determined to belong to an airtime balance class, or an income class. After one or more preset keywords identified in the original information are labeled according to their respective classes, the same labeling process may be implemented for one or more other original information in the original information sample set. This way, the original information sample set may be determined and set as the sample training set.

At 103, a segmentation process may be implemented that identifies clauses from the sample training set (e.g., electronic messages that are included in the sample training set) that include the preset keyword. A clause may be any combination of letters, numbers and other symbols that are part of the original information. For example, a clause may be the smallest grammatical unit of text contained in a SMS message that includes a subject and a predicate. The segmentation process may result in filtering out one or more words from consideration, and identifying one or more words that have not been filtered out from consideration as characteristic words.

For example, the words identified by the segmentation process may also include the preset keyword. In the example of the SMS message sent by the service provider ("your airtime balance is 12 Yuan"), the words identified by segmenting the SMS message for notifying the airtime balance sent by the service provider may include one or more of the words that comprise the statement represented by the SMS message. For example, both the preset keyword "12" and other words such as "your", "airtime" and so on, may be identified from the segmentation process at 103.

At 104, the segmentation process from 103 may be continued to determine a specified characteristic set extracted from one or more words identified from the segmentation process at 103, wherein the specified characteristic set includes at least one characteristic word.

For example, in the words identified by the segmentation process at 103, some words such as "ah", "ok", and other like words, may be considered useless for identifying the class of the preset keyword and thus may be filtered out of consideration for the specified characteristic set. The remaining words that are not filtered out from consideration may be analyzed to construct the template. After constructing the specified characteristic set in this way from the remaining words that are not filtered out from consideration, the characteristic word may be determined to be at least one of the words included in the specified characteristic set.

At 105, the template may be constructed based on one or more preset keywords and one or more characteristic words from the specified characteristic set.

The template may be constructed according to one or more exemplary embodiments. For example, the template may be constructed by referencing a classifier based on the characteristic word obtained according any one or more of the processes described herein, and the preset keyword.

At 106, the template may be trained based on labeling results in the sample training set. Exemplary labeling results are described with reference to the flow diagram 200 shown in FIG. 2.

After being trained, the template may be configured as a template for identifying an information class. For example, when information is inputted into the template, either the information alone or a SMS message including the information, the template may output the class of the information or obtain probabilities that the information belongs to one or more respective known classes.

In the method for constructing a template in the embodiment described by flow diagram 100, the template for identifying may be constructed and trained based on the sample training set including the preset keyword, so that the template may be used to identify the information class, and accuracy of information identification is improved.

Figure 2:
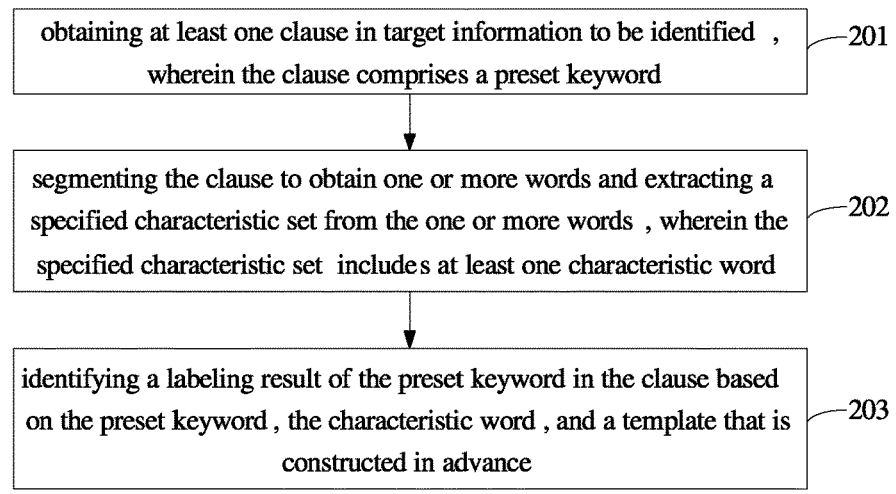
FIG. 2 shows a flow diagram describing a method for identifying information according to an exemplary embodiment.

FIG. 2 shows a flow diagram 200 describing a method for identifying information according to another exemplary embodiment. The method may be implemented by an application running on, for example, a communication device. The method may be used to identify an information class by referencing the trained template obtained according to the method described by flow diagram 100 from FIG. 1, and may include the following steps.

At 201, at least one clause may be obtained from target information to be identified, wherein the clause includes a preset keyword.

For example, the target information is a SMS message sent by an service provider, the at least one clause may be obtained from the SMS message. The at least one clause may include, for example, a clause stating "how do you do" or another clause stating that "your airtime balance is 12 Yuan". The at least one clause may include a preset keyword. For example, the preset keyword may be predetermined to be any number including one or more numerical digits, where the number may identify an airtime balance remaining or airtime balance used up for an account corresponding to the user of the communication device receiving the SMS message (e.g., the preset keyword may be the number "12" from the clause).

At 202, a segmentation process may be applied to the clause to identify one or more words, and extract a specified characteristic set from the one or more words, wherein the specified characteristic set includes at least one characteristic word. The segmentation process applied to the clause may, for example, follow the segmentation process described for flow diagram 100.

At 203, a labeling result of the preset keyword in the clause is identified based on the preset keyword, the at least one characteristic word, and a template that is constructed in advance.

For example, the information class may be identified based on the trained template by identifying the labeling result of the preset keyword in the target information. In the example of identifying the SMS message sent by the operator, it may be identified that the labeling result of the preset keyword is the airtime balance by using the template. For example, preset keywords may be input manually and/or settled prior to the current process.

In the method for identifying information in the embodiment described by flow diagram 200, the information class may be identified by using the template that is constructed in advance according to the process that follows the flow diagram 100, so accuracy of information identification may be improved.

Below, an application of the method provided by the disclosure in identifying the SMS message sent by the service provider is described by taking the identification of digital information in the SMS message as an example. Firstly, several examples of identifying the digital information in SMS messages are listed.

For example, for a SMS message that includes information stating "your airtime balance is less than 10 Yuan", the portion of the information stating "airtime balance—10 Yuan" may be identified from the rest of the SMS message by using the method described by flow diagram 200, i.e. a digital value of a class is identified.

For example, for a SMS message that includes information stating "your remaining flow is 845 MB this month", the portion of the information stating "remaining flow—845 MB" may be identified by using the method.

For example, for a SMS message that includes information stating "your grant balance is 344 Yuan, please confirm", the portion of the information stating "grant balance—344 Yuan" may be identified by using the method.

SMS messages received by a user from the service provider may include information that may correspond to one, or more classes of SMS messages, for example, the SMS messages mentioned above. It follows that SMS messages received by a user from the service provider may be assigned to one or more classes. Furthermore, a SMS message may sometimes include digital information assigned to multiple classes of digital information. The class of the digital information by the method may be set in advance, and thus may be understood to be a "preset class".

An "airtime balance" class may be determined as the preset class in the method for identifying information. When the SMS message received by the user is information that represents the statement "your grant balance is 344 Yuan, please confirm", although the SMS message also includes a numerical digit of "344", this numerical digit may not belong to a preset class. It follows that the method may return a result of null, i.e. the digital information of the "airtime balance" class may not be found. When the SMS message including information that represents "your airtime balance is less than 10 Yuan" is analyzed and the digital information corresponding to "10" is identified from this SMS message to belong to the "airtime balance" class, a numerical digit of "10" is returned as a digit to be identified.

Figure 3:
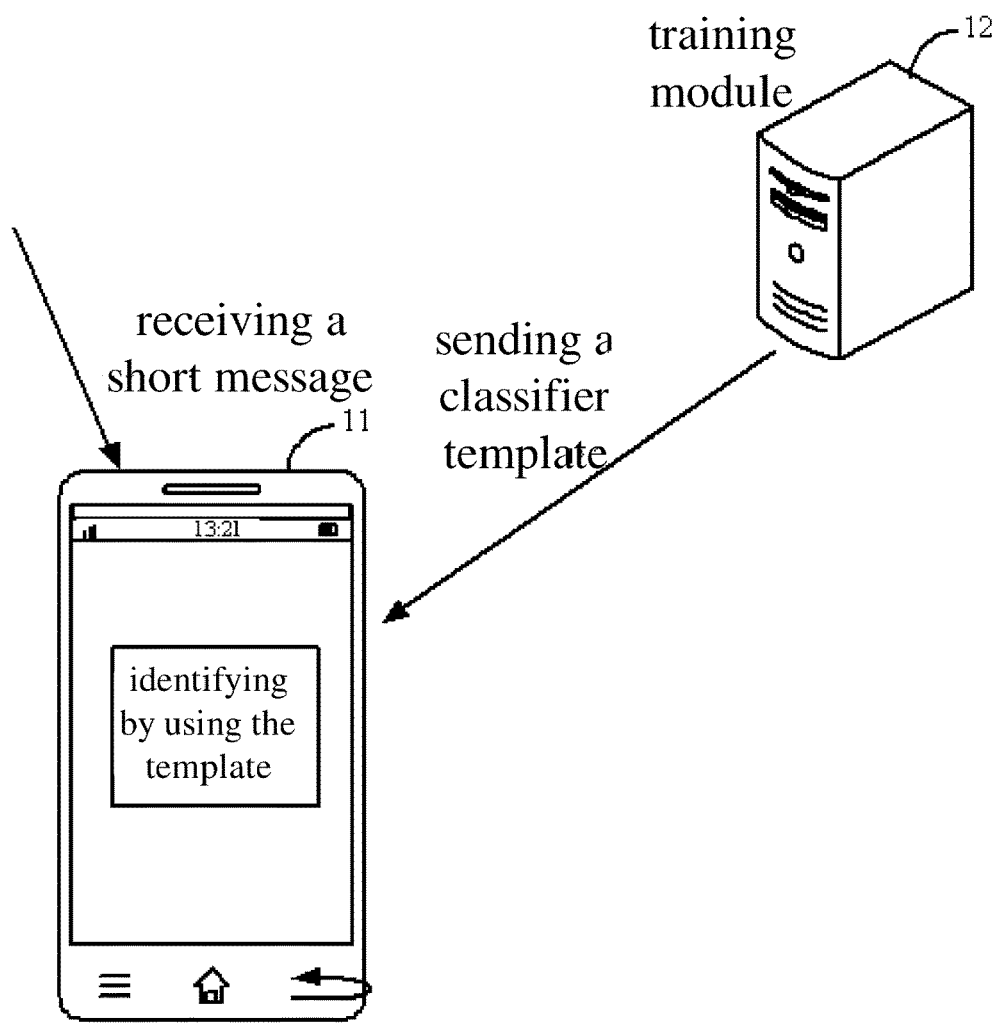
FIG. 3 shows a diagram showing a system for identifying digital information in an electronic message according to an exemplary embodiment.

FIG. 3 illustrates an exemplary system 300 for identifying digital information in a SMS message by using a method provided in this disclosure. As shown in FIG. 3, the system 300 may include a smart device 11 and a server 12. The smart device 11 may be a smart phone, which is capable of receiving a SMS message from an service provider, of a user. The server 12 may communicate with the smart phone to exchange information there between.

The template described herein may be utilized to identify digital information from received SMS messages. The template may be referenced as a classifier template, configured to identify a class for the digital information included in the SMS message. The classifier template may be obtained by the server 12 by means of training a template based on collected samples of previously received SMS messages, and the classifier template may be sent to the smart device 11. The smart device 11 may then identify the digital information in the SMS message by utilizing the classifier template. In an example of identifying the airtime balance by using the method provided in the disclosure, a process of training the template at a server (e.g., server 12) and a process of identifying the digital information by using the template at a smart device (e.g., smart device 11) are described below with reference to FIG. 4.

Figure 4:
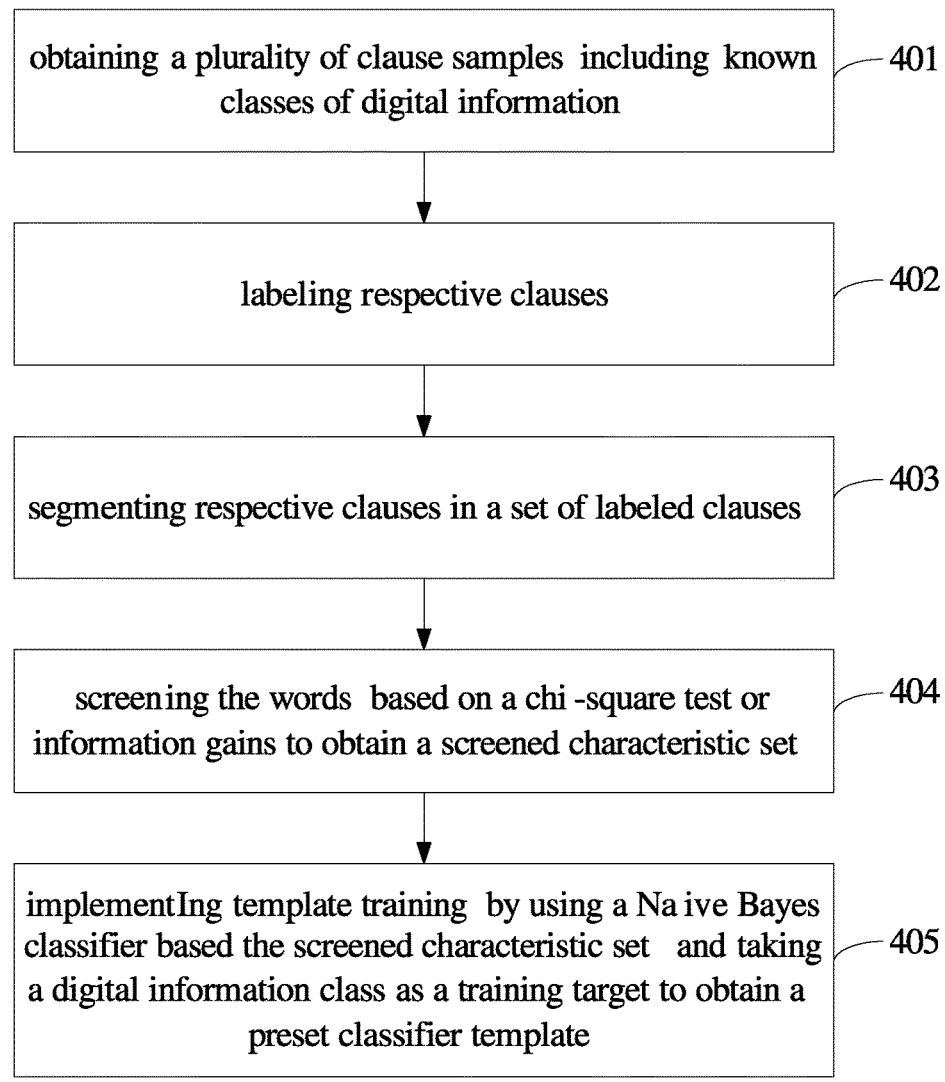
FIG. 4 shows a flow diagram describing another method for training a template according to an exemplary embodiment.

FIG. 4 shows a flow diagram 400 of logic describing a process of training a template according to an exemplary embodiment. The server may train the template by using the flow shown in FIG. 4 including the following steps, wherein the identification of the airtime balance is taken as an example.

At 401, a plurality of clause samples including known classes of digital information may be obtained.

Samples for training the template may be obtained in this step. For example, the server may collect SMS messages sent by the service provider, wherein the SMS messages may be considered the original information. The server may collect the SMS messages sent by the service provider by the following way: a plurality of receiving devices (for example, communication devices such as smart phones) actively forward the SMS messages sent by the service provider to the server upon receiving the SMS messages. In addition or alternatively, the server may obtain SMS messages by periodically requesting and receiving the SMS messages sent by the service provider from the devices. In the example of identifying the airtime balance, the collected SMS messages sent by the service provider may include at least one SMS message including a notification on the airtime balance.

After a SMS message is obtained, a clause included in the SMS message that identifies an amount of money may be extracted from the SMS message, wherein the amount of money may be identified by referencing a regular expression. The regular expression may be a logical formula including a sequence of characters that define a search pattern for operating on a character string, i.e. constituting a "rule string" by some specific characters that are defined in advance and any combination of the specific characters and filtering the character string by using the "rule string". For example, the information in the SMS message may be compared to the logical formula on the character string, where the character string corresponds to an amount of money. When the information from the SMS message is determined to match, or otherwise satisfy a matching condition of the logical formula on the character string, the information may be determined to identify an amount of money.

A set of clauses including the amount of money may be identified from a set "T". For example, the set T may include such clauses as "your airtime balance is 64.8 Yuan", "your agreement balance is 924 Yuan", "your grant balance is 344 Yuan" and so on.

At 402, respective clauses may be labeled. For example, 64.8, 924 and 344 are labeled.

For example, classes of the digital information in respective clauses may be identified at 402, wherein the digital information identifying a numerical value such as 64.8, 924, and other such numerical values included in the clauses of the SMS message, may be assigned as the preset keyword included in the original information. The classes of the digital information may be labeled manually. In addition or alternatively, the classes of the digital information may be automatically labeled by the server based on a label included in a preset keyword set, wherein the preset keyword set may include preset keywords and class information thereof. For example, the preset keyword set may include information identifying attributes of the digital information and corresponding labels. Then the attributes of the digital information may be compared to the digital information to identify a satisfying digital information according to a matching of digital information attributes, such that the label corresponding to the matching digital information attribute in the preset keyword set will be assigned to the satisfying digital information from the original information.

A name for a class of digital information may be customized. For example, there may be three classes: "airtime balance", "other balance", and "non balance". Illustratively, the classes of the digital information in the clauses at 401 may be labeled. For example, 64.8 may be labeled as corresponding to the "airtime balance" class, 924 may be labeled as corresponding to the "other balance" class, and 344 may be labeled as corresponding to the "non balance" class. A set of labeled clauses may be referenced with the set T-tag, wherein respective clauses in the set include the digital information, and the classes of the digital information are known.

The labeling process described with reference to flow diagram 400 may be applied to one or more original information to generate an original information sample set that includes labeled original information. The original information sample set may be referenced as the sample training set, in which preset keywords identified in the original information are labeled. For example, the preset keyword "64.8" identified from an original information statement may be labeled as the "airtime balance" class.

At 403, a segmentation process may be applied to respective clauses from the original information sample set. The segmentation process may follow the segmentation process described with reference to flow diagram 100.

For example, the clauses in the set T may be segmented at 403 to obtain one or more words, such as "your", "airtime", "balance", "64.8", "Yuan", "agreement payment", "is" and so on, wherein the preset keyword, for example "64.8" is included in the one or more words that comprise the SMS message (i.e., the original information). These words obtained by the segmentation may be called as "characteristic words", and a set of characteristic words may be identified as set W.

At 404, the characteristic words identified as set W may be screened to filter out words that are considered useless based on a chi-square test or information gains to obtain a screened characteristic set. A Kullback-Leibler divergence model may also be used.

For example, in the characteristic words obtained by the segmentation at 403 in flow diagram 400, some words may be considered useless for class training and thus may be screened from further consideration, so that the characteristic words that remain may be optimized. The characteristic words may be screened based on the chi-square test or the information gains in this step.

The chi-square test quantizes relevance between characteristics and classes. As the chi-square test determines a stronger relevance, a score of a characteristic may be higher, and a probability that the characteristic is preserved may be higher. For the information gains, a measurement of importance is how much information a characteristic carries for a classifier system, wherein the more information the characteristic carries, the more important the characteristic is determined to be. Importance degrees of the characteristic words may be quantized based on the chi-square test or the information gains, so the selection may be optimized. The optimized characteristic word set may be identified by set F. For example, some words such as "is", "your" and other non-reliable words, may be screened out as not being considered as a characteristic word at 403. The screened characteristic set obtained by the segmentation process at 404 may include the one or more characteristic words from set W that remain after the useless words are filtered out from consideration based on the segmentation process.

At 405, a template may be trained by using, for example, a Naive Bayes classifier based on the screened characteristic set to obtain a preset classifier template, where a digital information class may be referenced as a training target.

For example, when the class corresponding to the amount of money identified in the clauses is assigned as the training target, the set T may be trained by using the screened characteristic set F that is obtained by the screening at 404 in flow diagram 400, wherein the template may be trained by using the Naive Bayes classifier. A classifying method according to the Naive Bayes classifier may include the following: on the basis of statistic materials, probabilities of respective classes are calculated based on some characteristics so as to implement classification. In scenarios in which the number of samples is relatively small and the template is trained based on the information included in the SMS messages, the Naive Bayes classifier may achieve a better classification effect. In the example, probabilities that the characteristic word belongs to respective classes may be calculated. The template obtained by training may be represented by set M.

In this step, the template may be constructed based on the preset keyword and the screened characteristic set, and may be trained based on the labeling results in the sample training set. For example, the labeling results in the sample training set may include "labeling 64.8 as an airtime balance"; digits in the samples are labeled according to their respective classes. The Naive Bayes classifier template may be constructed based on the determined characteristic words such as "airtime" and "balance" extracted from the SMS messages; respective characteristic words in the Naive Bayes classifier may be independent of each other. The template may be trained, and the trained Naive Bayes classifier may obtain the class for some of the information included in the SMS message.

For example, when the template is trained, for each characteristic word in the Naive Bayes classifier, a number of clauses that includes the characteristic word and the preset keyword and are a first clause may be counted based on the labeling results in the sample training set. The trained Naive Bayes classifier may be obtained based on respective characteristic words, the preset keyword, and/or the number. The trained Naive Bayes classifier may be used to obtain the probabilities that respective characteristic words belong to respective classes.

In the embodiment, the server may obtain the classifier template by training the clause samples and sending the classifier template to the smart phone for identifying the preset target class of digital information in the SMS messages, so that accuracy of digital information identification is improved.

The server may send the template set M to the smart phone upon obtaining the template according to the training, so the smart phone may use the template to identify the digital information in the SMS messages the smart phone receives.

The process of identifying the digital information by the smart phone may be described by the following.

Figure 5:
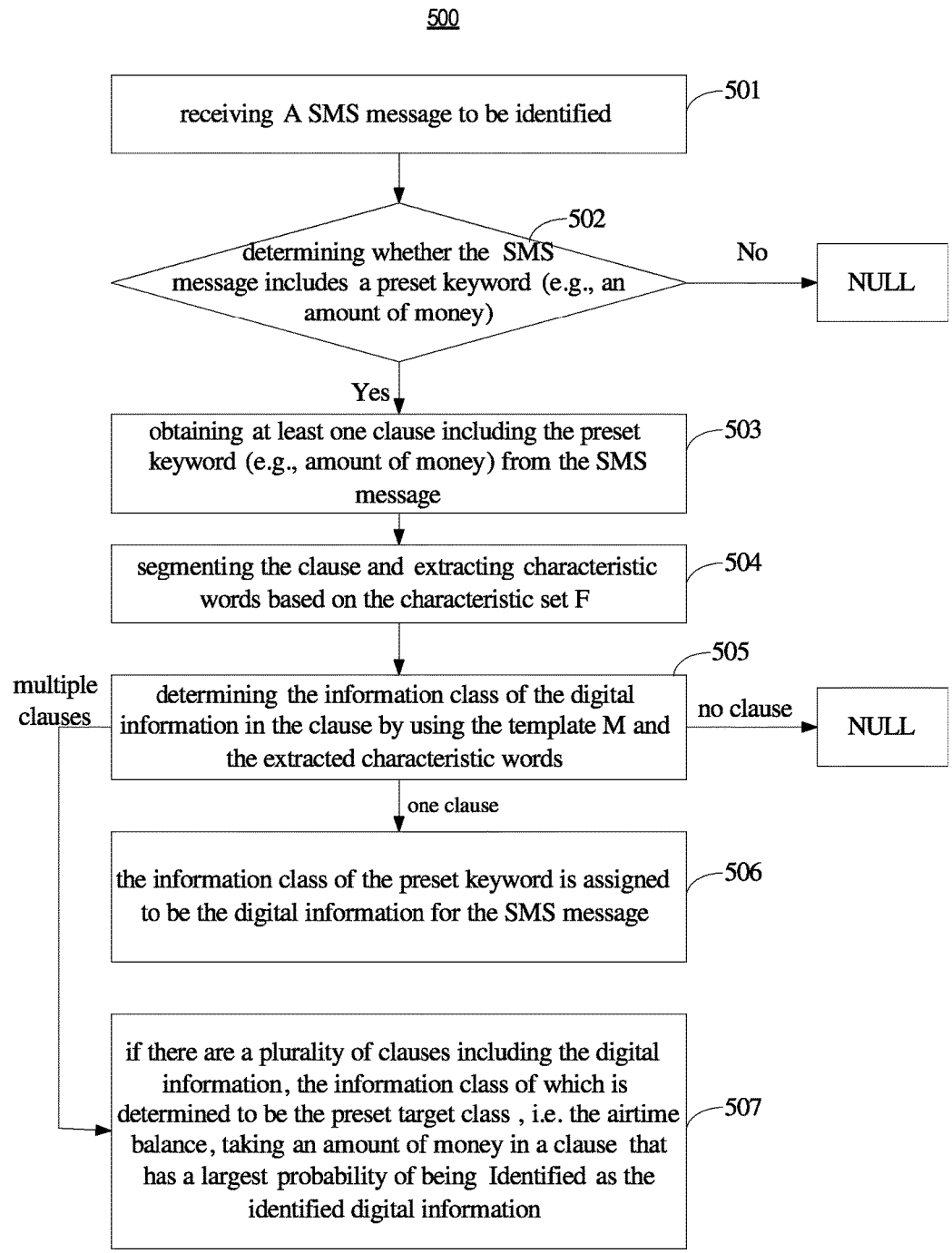
FIG. 5 shows a flow diagram describing another method for identifying information according to an exemplary embodiment.

FIG. 5 shows a flow diagram 500 describing a method for identifying information according to an exemplary embodiment. An application running on the smart phone may be configured to identify digital information by using a template according to the flow diagram 500 shown in FIG. 5. In the example of identifying the airtime balance, the method may include the following steps.

At 501, a SMS message to be identified may be received. For example, the smart phone may receive a SMS message from a service provider, where the received SMS message is the target information to be identified.

At 502, it may be determined whether the SMS message includes information identifying a preset keyword (e.g., an amount of money).

When the determination at 502 is not affirmative, the process may return a NULL value indicating that the SMS message does not include information identifying an amount of money. When the determining result at 502 is affirmative thus indicating the SMS message includes information identifying an amount of money, the process may continue to 503 where at least one clause including the amount of money is acquired from the SMS message.

For example, the SMS message may include a plurality of clauses such as when the SMS message includes information representative of the statement "your grant balance is 344 Yuan, please confirm and contact us if you have any question", and a clause including digital information may be selected at 503. Here, the digital information corresponds to the amount of money identified in the SMS message. For example, "your grant balance is 344 Yuan" is a clause including the digital information, and "please contact us if you have any question" is a clause that does not include an amount of money, and therefore this clause may not be selected. The clause may further include a preset keyword such as, for example, the digital information identifying the preset keyword number "344" with respect to the "344 Yuan".

At 504, the identified clause may be segmented and characteristic words may be extracted based on the characteristic set F.

For example, words belonging to the characteristic set F obtained in the embodiment described by the flow diagram 400 in FIG. 4 may be extracted from the clause obtained at 503, based on the characteristic set F, whereas other remaining words may not be selected.

At 505, an information class of the digital information in the identified clause may be determined by using the template M and the extracted characteristic words.

In this step, a labeling result of the digit in the SMS message may be identified based on the trained template, the extracted characteristic words, the preset keyword and so on. That is, the class of the number may be determined. For example, it may be determined whether the number identified as the preset keyword in the SMS message (e.g., "344") identifies the airtime balance. For any clause, probabilities that the amount of money in the clause belongs to respective classes (i.e. "airtime balance", "other balance", or "non balance") are obtained based on the probabilities that every characteristic word in the clause belongs to respective classes. The class having the largest probability may be determined to be the class to which the number identified as the preset keyword in the clause belongs.

If there is no clause including an amount of money, or other number identified as the preset keyword, that is determined to be the "airtime balance" in the SMS message, Null is returned as shown in flow diagram 500. When there is one clause determined to include an amount of money, or other number identified as the preset keyword, that is determined to be the "airtime balance" in the SMS message, the method described by flow diagram 500 may continue to 506. When there are a plurality of clauses determined to include an amount of money, or other number identified as the preset keyword, that is determined to be the "airtime balance", the method described by flow diagram 500 may continue to 507.

At 506, the information class (e.g., airtime balance) corresponding to the preset keyword (e.g., amount of money), or other number or digital information identified as the preset keyword, may be assigned to be the digital information that is identified for the SMS message.

At 507, when there are a plurality of clauses determined to include the digital information, the information class corresponding to the preset target class (i.e. when there are a plurality of clauses determined to include an amount of money, or other number identified as the preset keyword, that is determined to be the "airtime balance", an amount of money, or other number identified as the preset keyword) in a clause having the largest probability of being identified as the airtime balance may be assigned to be the identified digital information. So if more than one number is identified within a clause and it is determined that they may belong to the same "airtime balance" class, then only the number from the clause having the highest probability of being identified as the airtime balance is confirmed to belong to the "airtime balance" class. Because, in practice, there would be no more than one number in an clause that would belong to the "airtime balance" class.

In this step, there are a plurality of clauses whose labeling results are a preset labeling result, i.e. there are a plurality of clauses determined to include the airtime balance, or other number identified as the preset keyword. Then, the preset keyword in a clause that has a largest probability of being identified is assigned as the identified digital information.

In this example, the airtime balance of the user may be automatically identified from the SMS message received by the user from the service provider, and the class of the SMS message may be predicted using the classifier template, so the accuracy of classification prediction is relatively high.

Furthermore, it should be appreciated that the server may periodically update the template. For example, the server may periodically collect new SMS message samples, and obtain new clause samples from the new SMS message samples, wherein the new clause samples include known classes of digital information. The server may re-trains the template based on the new clause samples and send the updated classifier template to the smart phone after the new classifier template is obtained by the server, so that the smart phone may identify the digital information based on the new template.

After the digital information in the SMS messages is identified, there may be a plurality of applications capable of implementing some application operations and processing based on the result of identifying the digital information. For example, when the value of the identified digital information is less than or equal to a numerical threshold, a reminder may be provided to the user of the smart phone, or other communication device receiving the SMS message, based on the digital information. The reminder may be used to remind the user of, for example, a prepaid recharge when the airtime balance is too low, or to remind the user of flow recharge (e.g., replenish a prepaid mobile subscription account) when the remaining flow is too little.

Below, two examples of digital information reminder, for example, an airtime balance reminder, are provided.

In an example, it is assumed that an airtime balance threshold is 15 Yuan. When it is determined that the airtime balance of a user is 10 Yuan, which is less than the threshold, by the above method for identifying information, a shortcut interface for adjusting digital information may be provided in a SMS message, so that the user may adjust the digital information via the shortcut interface. Here, the processing of adjusting the digital information may be prepaid recharge for increasing the airtime balance by the user, and the user may enter an interface for prepaid recharge via the shortcut interface.

Figure 6:
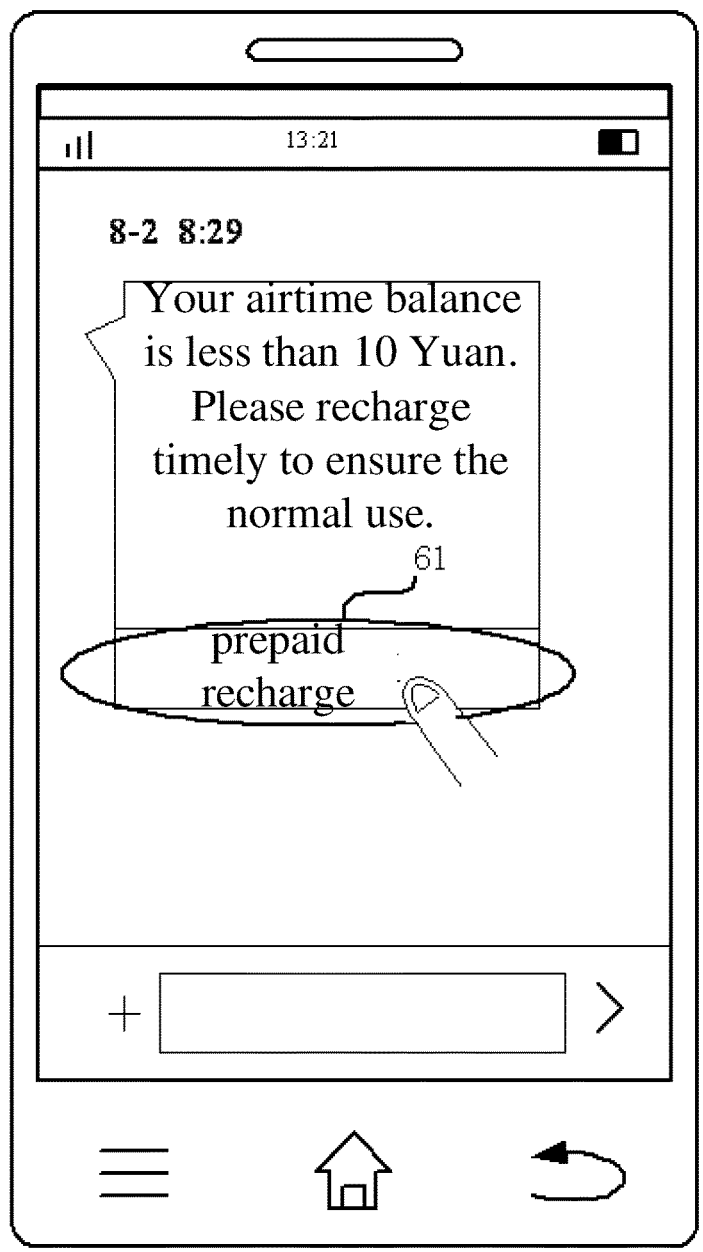
FIG. 6 shows a diagram of a display mode of a shortcut interface according to an exemplary embodiment.

FIG. 6 illustrates an exemplary display mode of the shortcut interface displayed on a smart phone 600. The smart phone 600 may have received a SMS message from an service provider, where the SMS message identifies that an airtime balance of the user and/or smart phone 600 is 10 Yuan, which is less than the predetermined threshold of 15 Yuan. The airtime balance information included in the SMS message may have been determined according to any one or more of the processes for determining information from a received SMS message described herein. A shortcut interface 61 may be included in the shortcut interface and displayed at the bottom of the SMS message, wherein the shortcut interface 61 may display its own SMS message stating "prepaid recharge". Of course, the shortcut interface 61 may also display other SMS messages such as, for example, "quick recharge", "recharge immediately" or the like.

The user may click an area of the smart phone 600 that coincides with the display of the shortcut interface 61 to enter the interface for prepaid recharge. The interface for prepaid recharge may, for example, navigate the smart phone 600 to a recharge website for initiating a prepaid recharge. This display mode of the shortcut interface 61 allows the user to jump to the interface for prepaid recharge by directly clicking the shortcut interface 61 in the SMS message upon seeing the SMS message, so the efficiency of recharge operations is greatly improved as compared with a traditional mode in which it is necessary for the user to exit from the SMS message, search for and then enter the interface for prepaid recharge.

In another example, when it is identified that the airtime balance of the user is 10 Yuan, which is less than the predetermined threshold, the smart phone 600 may also query for an updated value of the digital information from a device sending the SMS message (e.g., the device sending the electronic message may be a device operated by a service provider such as China Mobile). For example, after a service provider (e.g., China Mobile) sends an airtime balance reminder SMS message to the user, the user may continue to use the smart phone 600, so the user may continue to use up the remaining airtime balance. In this example, the smart phone 600 may actively query for variances of the airtime balance, for example, querying the service provider for the airtime balance once every day. The querying may be implemented by an application running on the smart phone 600 to conduct backstage querying which may not be perceptible to the user.

When it is determined that the digital information is less than or equal to a threshold warning value based on the updated value that is queried, (for example, the airtime balance of the user is 2 Yuan and the smart phone will be shut down soon) the smart phone 600 may display a digital information warning notification related to the threshold warning value (for example, a pop up warning notification, to remind the user to recharge timely). This example is provided in consideration that some user will forget to recharge after receiving the airtime balance reminder SMS message, leading to the smart phone 600 shutting down, which will affect usage of the smart phone 600 by the user. By this solution, the smart phone may monitor the variances of the airtime balance at backstage and notify the user of recharging timely by displaying the threshold warning value, so the shutting down of the smart phone may be avoided.

Figure 7:
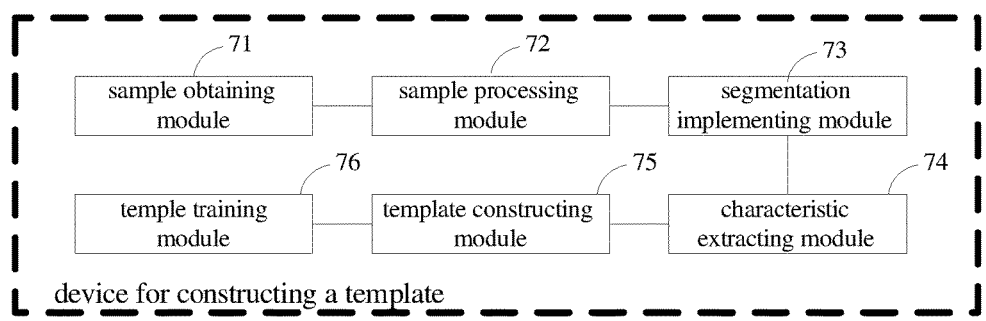
FIG. 7 shows a structure diagram of a device for constructing a template according to an exemplary embodiment.

FIG. 7 shows a structure diagram of a device 700 for constructing a template according to an exemplary embodiment. The device 700 may be configured to implement the methods for constructing a template in the present disclosure, and may be applicable to for example, a server device. As shown in FIG. 7, the device 700 may include a sample obtaining module 71, a sample processing module 72, a segmentation implementing module 73, a characteristic extracting module 74, a template constructing module 75, and a temple training module 76. A module as described herein may include hardware, software, middleware, and/or circuitry for implementing features described as being attributable to the corresponding module.

The sample obtaining module 71 may be configured to obtain an original information sample set including at least one piece of original information that belongs to a preset class.

The sample processing module 72 may be configured to, in case that the original information includes a preset keyword, label the preset keyword based on a preset keyword set to obtain a sample training set.

The segmentation implementing module 73 may be configured to segment clauses including the preset keyword in the sample training set to obtain one or more words.

The characteristic extracting module 74 may be configured to extract a specified characteristic set from the one or more words, wherein the specified characteristic set includes at least one characteristic word.

The template constructing module 75 may be configured to construct the template based on the preset keyword and the characteristic word in the specified characteristic set.

The template training module may be is configured to train the template based on labeling results in the sample training set.

Furthermore, the characteristic extracting module 74 may be configured to extract the specified characteristic set from the one or more words by means of a chi-square test or information gains.

Furthermore, the template constructing module 75 may be configured to construct a Naive Bayes classifier with the characteristic word in the specified characteristic set and the preset keyword, wherein respective characteristic words in the Naive Bayes classifier are independent of each other.

Furthermore, the template training module 76 may be configured to, for each characteristic word in the Naive Bayes classifier, count a number of clauses that include the characteristic word and the preset keyword and are a first clause, based on the labeling results in the sample training set, and obtain the trained Naive Bayes classifier based on respective characteristic words, the preset keyword, and the number.

Furthermore, the preset keyword is digital information, and the labeling results are attributes of the digital information.

Figure 8:
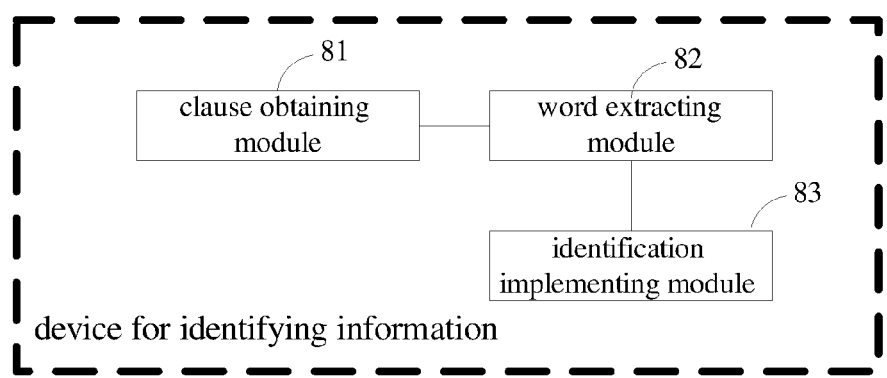
FIG. 8 shows a structure diagram of a device for identifying information according to an exemplary embodiment.

FIG. 8 shows a structure diagram of a device 800 for identifying information according to an exemplary embodiment. The device 800 may be used to implement the method for identifying information in the present disclosure, and may be applicable to for example, a smart phone device. As shown in FIG. 8, the device 800 may include a clause obtaining module 81, a word extracting module 82, and an identification implementing module 83.

The clause obtaining module 81 may be configured to obtain at least one clause in target information to be identified, wherein the clause includes a preset keyword.

The word extracting module 82 may be configured to segment the clause to obtain one or more words and extract a specified characteristic set from the one or more words, wherein the specified characteristic set includes at least one characteristic word.

The identification implementing module 83 may be configured to identify a labeling result of the preset keyword in the clause based on the preset keyword, the characteristic word, and a template that is constructed in advance.

Furthermore, the identification implementing module 83 may be configured to, in case that there are a plurality of clauses whose labeling results are a preset labeling result, take the preset keyword in a clause that has a largest probability of being identified as information of the preset labeling result.

Furthermore, the word extracting module 82 may be configured to extract the specified characteristic set from the one or more words by means of a chi-square test or information gains.

Furthermore, the preset keyword is digital information, and the labeling result is an attribute of the digital information.

Figure 9:
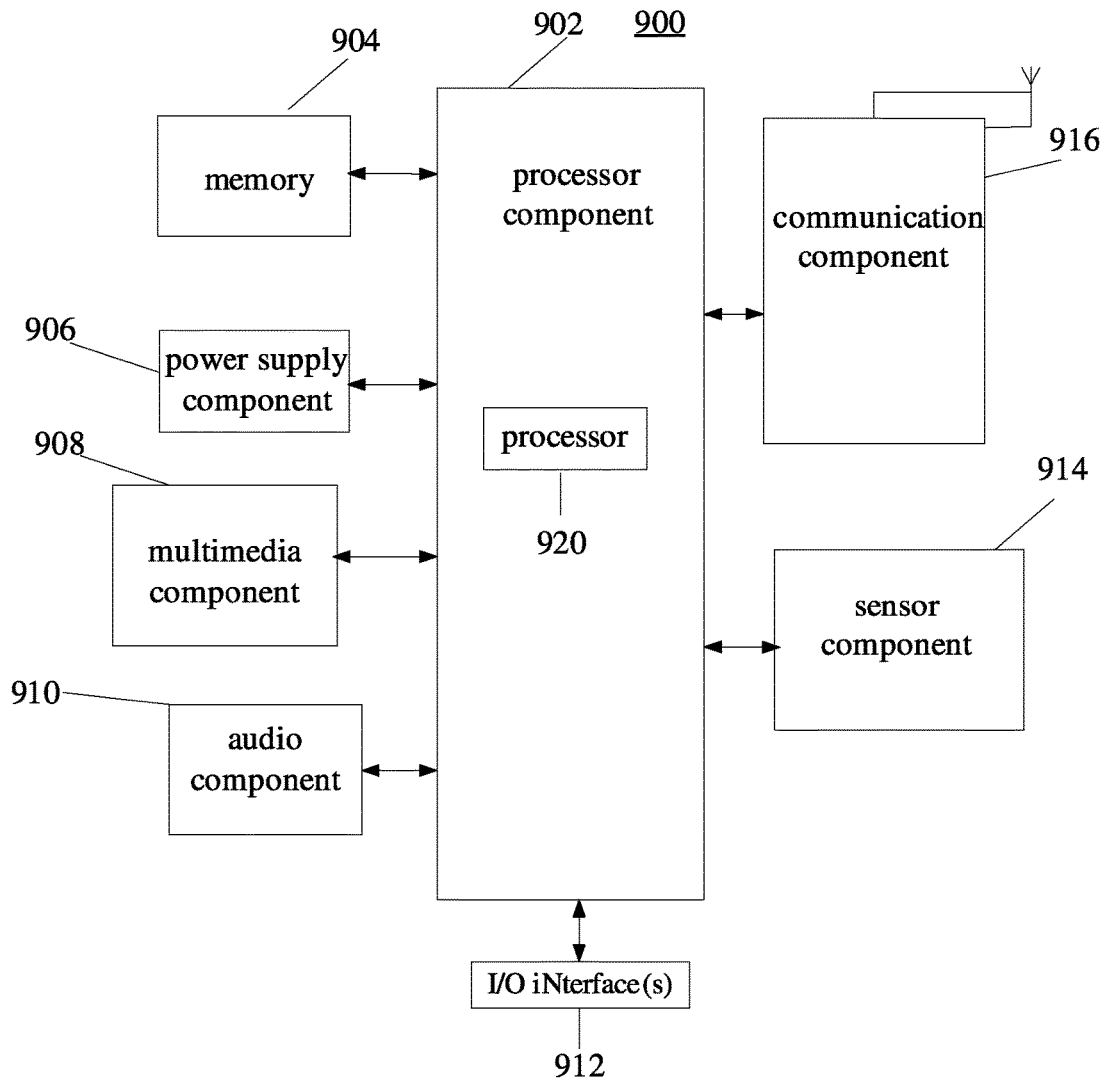
FIG. 9 shows a block diagram of a device for identifying information according to an exemplary embodiment.

FIG. 9 shows a block diagram of an apparatus 900 for identifying information according to an exemplary embodiment. For example, the apparatus 900 may be a mobile phone, a computer, a digital broadcast terminal, a messaging device, a gaming console, a tablet, a medical device, exercise equipment, a personal digital assistant, or another communication device.

Referring to FIG. 9, the apparatus 900 may include one or more of the following components: a processor component 902, a memory 904, a power supply component 906, a multimedia component 908, an audio component 910, an input/output (I/O) interface 912, a sensor component 914, and a communication component 916.

The processor component 902 typically controls overall operations of the apparatus 900, such as the operations associated with display, telephone calls, data communications, camera operations, and recording operations. The processor component 902 may include one or more processors 920 to execute instructions to implement the methods for identifying information in the present disclosure. Moreover, the processor component 902 may include one or more modules which facilitate the interaction between the processor component 902 and other components. For example, the processor component 902 may include a multimedia module to facilitate the interaction between the multimedia component 908 and the processor component 902.

The memory 904 is configured to store various types of data to support the operations of the apparatus 900. Examples of such data include instructions for any applications or methods operated on the apparatus 900, contact data, phonebook data, SMS messages, pictures, videos, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 906 supplies power to various components of the apparatus 900. The power supply component 906 may include a power management system, one or more power supplies, and any other components associated with the generation, management, and distribution of power for the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive multimedia data from external while the apparatus 900 is in an operation mode, such as a photographing mode or a video mode. Each of the front camera and the rear camera may be a fixed optical lens system or have optical focusing and zooming capability.

The audio component 910 is configured to output and/or input audio signals. For example, the audio component 910 includes a microphone ("MIC") configured to receive audio signals from external when the apparatus 900 is in an operation mode, such as a call mode, a recording mode, and a voice recognition mode. The received audio signals may be further stored in the memory 904 or transmitted via the communication component 916. In some embodiments, the audio component 910 further includes a speaker to output audio signals.

The I/O interface 912 provides an interface between the processor component 902 and peripheral interface modules, the peripheral interface modules being, for example, a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components (e.g., the display and the keypad of the apparatus 900), a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of a nearby object without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The apparatus 900 may access a wireless network based on a communication standard, such as WiFi, 2G, or 3G, or a combination thereof. In an exemplary embodiment, the communication component 916 receives a broadcast signal or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as a memory including instructions, executable by the processor in the apparatus, for performing the above-described methods. For example, the non-transitory computer-readable storage medium may be a ROM, a RAM, a CD-ROM, a magnetic tape, a floppy disc, an optical data storage device, and the so on.

Figure 10:
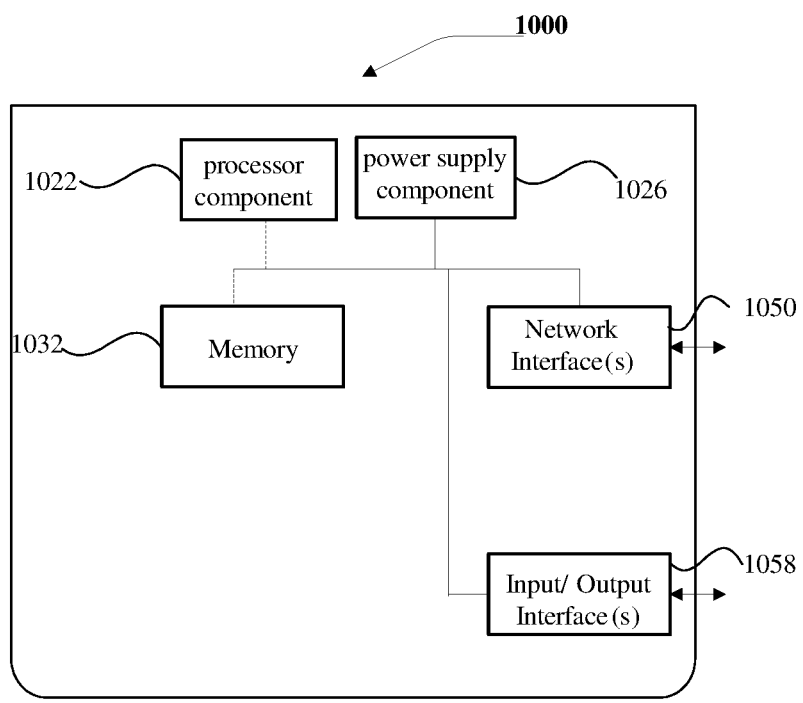
FIG. 10 shows a block diagram of a device for constructing a template according to an exemplary embodiment.

FIG. 10 shows a block diagram of a device 1000 for constructing a template according to an exemplary embodiment. For example, the device 1000 may be a server. As shown in FIG. 10, the device 1000 includes a processor component 1022, which includes one or more processors, and memory resources represented by a memory 1032 for storing instructions, for example, application programs, executable by the processor component 1022. The application programs stored in the memory 1032 may include one or more modules, each of which may include a set of instructions. Further, the processor component 1022 may be configured to execute the instructions to implement the methods for constructing a template in the present disclosure.

The device 1000 may also include a power supply component 1026 configured to implement power management on the device 1000, a wired or wireless network interface 1050 configured to connect the device 1000 to a network, and an input/output interface 1058. The device 1000 may operate based on an operating system such as Windows Server™, Mac OS X™, Unix™, Linux™, FreeBSD™, or the like stored in the memory 1032.

Other embodiments of the disclosure will be apparent to those skilled in the art from consideration of the specification and practice of the invention disclosed here. This application is intended to cover any variations, uses, or adaptations of the disclosure following the general principles thereof and including such departures from the present disclosure as come within known or customary practice in the art. The specification and embodiments are merely considered to be exemplary and the substantive scope and spirit of the disclosure is limited only by the appended claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for identifying digital information included in an electronic message received by a smart device, comprising:
    identifying a clause in the electronic message, wherein the clause comprises a preset keyword and the electronic message is a Short Message Service (SMS) message transmitted from a service provider;
    segmenting the clause to identify one or more words from the clause;
    extracting at least one characteristic word from the identified one or more words;
    identifying a labeling result of the preset keyword based on the preset keyword, the characteristic word, and a predetermined template, wherein the preset keyword is digital information and the labeling result is an attribute of the digital information; and
    when the attribute of the digital information is an airtime balance or a remaining flow:
        when the value of the digital information is less than or equal to a numerical threshold, providing a shortcut interface for implementing a prepaid recharge; and
        periodically querying a terminal sending the electronic message to obtain an updated value of the digital information, and when the updated value of the digital information is less than or equal to a threshold warning value, providing a warning notification for reminding the user to timely recharge.

2. The method of claim 1, further comprising:
    when the electronic message includes a plurality of preset keywords corresponding to a plurality of clauses, determining a greatest preset keyword in a clause having a greatest probability of being identified as information of a preset labeling result.

3. The method of claim 1, wherein extracting the at least one characteristic word comprises:
    extracting the at least one characteristic word according to a chi-square test; or
    extracting the at least one characteristic word according to information gains.

4. A smart device, comprising:
    a processor; and
    a memory configured to store instructions executable by the processor;
    wherein the processor is in communication with the memory and configured to execute the instructions to:
        identify a clause in an electronic message, wherein the clause comprises a preset keyword and the electronic message is a Short Message Service (SMS) message transmitted from a service provider;
        segment the clause to identify one or more words from the clause;
        extract at least one characteristic word from the identified one or more words;
        identify a labeling result of the preset keyword based on the preset keyword, the characteristic word, and a predetermined template, wherein the preset keyword is digital information and the labeling result is an attribute of the digital information; and
        when the attribute of the digital information is an airtime balance or a remaining flow:
            when the value of the digital information is less than or equal to a numerical threshold, provide a shortcut interface for implementing a prepaid recharge; and
            periodically query a terminal sending the electronic message to obtain an updated value of the digital information, and when the updated value of the digital information is less than or equal to a threshold warning value, provide a warning notification for reminding the user to timely recharge.

5. The device of claim 4, wherein the processor is further configured to execute the instructions to, when the electronic message includes a plurality of preset keywords corresponding to a plurality of clauses, determine a greatest preset keyword in a clause having a greatest probability of being identified as information of a preset labeling result.

6. The device of claim 4, wherein the processor is further configured to execute the instructions to extract the at least one characteristic word according to a chi-square test or information gains.

7. A non-transitory computer-readable storage medium having stored therein instructions that, when executed by a processor of a smart device, causes the processor to perform a method for identifying information included in an electronic message, the method comprising:
- identifying a clause in the electronic message, wherein the clause comprises a preset keyword and the electronic message is a Short Message Service (SMS) message transmitted from a service provider;
- segmenting the clause to identify one or more words from the clause;
- extracting at least one characteristic word from the identified one or more words;
- identifying a labeling result of the preset keyword based on the preset keyword, the characteristic word, and a predetermined template, wherein the preset keyword is digital information and the labeling result is an attribute of the digital information; and
- when the attribute of the digital information is an airtime balance or a remaining flow:
    - when the value of the digital information is less than or equal to a numerical threshold, providing a shortcut interface for implementing a prepaid recharge; and
    - periodically querying a terminal sending the electronic message to obtain an updated value of the digital information, and when the updated value of the digital information is less than or equal to a threshold warning value, providing a warning notification for reminding the user to timely recharge.

8. The non-transitory computer-readable storage medium of claim 7, wherein the method further comprises:
- when the electronic message includes a plurality of preset keywords corresponding to a plurality of clauses, determining a greatest preset keyword in a clause having a greatest probability of being identified as information of a preset labeling result.

9. The non-transitory computer-readable storage medium of claim 7, wherein extracting the at least one characteristic word comprises:
- extracting at least one characteristic word according to a chi-square test; or
- extracting the at least one characteristic word according to information gains.

* * * * *